United States Patent Office 3,239,354 Patented Mar. 8, 1966

3,239,354

ESTROGENIC COMPOUNDS AND ANIMAL GROWTH PROMOTERS

Edward B. Hodge, Phil H. Hidy, and Herbert L. Wehrmeister, Terre Haute, Ind., assignors to Commercial Solvents Corporation, a corporation of Maryland
No Drawing. Filed Feb. 15, 1965, Ser. No. 432,892
12 Claims. (Cl. 99—2)

The present invention relates to new compounds and an object of the present invention is to provide compounds which exhibit estrogenic activity or aid in increasing the rate of growth in meat-producing animals, e.g. cattle, lamb and swine.

A conventional formula for the compounds of the present invention is:

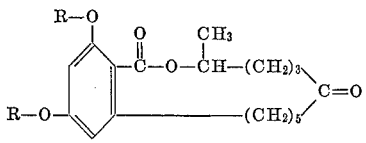

where R is hydrogen or substituted or unsubstituted alkyl, e.g. lower alkyl such as methyl, ethyl, hexyl, etc., but hydrogen is preferred. Compounds having the above formula wherein R is substituted or unsubstituted aryl, e.g. phenyl and bromophenyl, acyl e.g. acetyl and valeryl and aralkyl, e.g. benzyl, are also contemplated by the present invention.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps; vegetable proteins like soybeans oil meal or peanut oil meal; vitaminaceous materials, e.g. vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The compounds of the present invention can be produced from the compound:

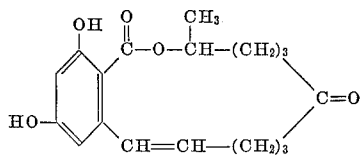

hereinafter referred to as the fermentation estrogenic substance (F.E.S.) by reduction of the olefinic bond. The nomenclature used herein is based upon the F.E.S. compound. For example, the compound produced upon reduction of the olefinic bond is referred to as dihydro F.E.S. Compounds of this invention where both R's are alkyl are referred to as dialkyl-, and where one of the R's is alkyl as monoalkyl-, dihydro F.E.S.

The olefinic bond of F.E.S. can be reduced, for example, by hydrogenation in the presence of a Group VIII metal, particularly platinum or palladium catalyst on a suitable carrier, e.g. charcoal. Generally, the catalyst contains from about 0.01 to about 10% of the catalytic metal. The catalyst is used in a ratio of generally between 0.02 to 2 grams of catalyst, preferably about 0.1 to 0.5 gram and particularly about 0.2 gram catalyst, per gram of F.E.S. The reduction may be carried out while the F.E.S. is dissolved in a suitable solvent, e.g. an alcohol, especially a lower alkanol such as 2-propanol, methanol, ethanol and acid, e.g. acetic acid, etc., at ambient temperatures, e.g. from about 15° to 40° C., and ambient pressures since only the presence of hydrogen is required; however, it is preferred to utilize an elevated pressure, e.g. from about 1 to 50 atmospheres of hydrogen.

In producing compounds of the present invention where R is alkyl, conventional alkylation procedures can be used to replace the H atom of one or both of the OH groups on the benzene ring of F.E.S. with an alkyl group. Alkylated dihydro F.E.S. compounds can be produced, for example, by first alkylating F.E.S. and then reducing it as set forth, supra, or by first reducing it and then alkylating it. The alkylation can be by reaction with the corresponding dialkyl sulfates, e.g. dimethyl sulfate, diethyl sulfate, etc. to produce the dialkyl F.E.S. or a monoalkyl F.E.S. with the alkyl group replacing the hydrogen of the hydroxyl group on the benzene ring ortho to the ester group. Furthermore, a monomethyl F.E.S. compound with the methyl group replacing the hydrogen of the hydroxyl group para to the ester group can be selectivelv produced using diazomethane.

The fermentation estrogenic substance (F.E.S.) is so named since a convenient method for producing it is by cultivating, on a suitable nutrient medium, the organism *Gibberella zeae* (Gordon) on deposit at the Northern Utilization Research and Development Division of the United States Department of Agriculture under the number NRRL–2830.

The following examples are offered to illustrate this invention; however the invention is not limited to the specific materials, amounts, and procedures set forth. The first example illustrates preparation of a suitable inoculum containing the organism *Gibberella zeae* (Gordon) NRRL–2830.

*Example I*

A spore sand culture containing *Gibberella zeae* (Gordon) NRRL–2830 was aseptically placed in a sterile tube containing 15 ml. of Czapek's-Dox solution and a small amount of agar. This medium was then incubated for about 168 hours at approximately 25° C. At the end of the incubation period, the medium was washed with 5 ml. of sterile deionized water and transferred to a sterile tube containing 45 ml. of Czapek's-Dox solution. The contents of the tube were then incubated for about 96 hours at about 25° C. after which the material was available for use in inoculation of a fermentation medium.

The following example illustrates the fermentation of the organism *Gibberella zeae* (Gordon) NRRL–2830 to produce F.E.S.

*Example II*

To a 2-liter flask were added 300 grams of finely divided corn. The flask and its contents were then sterilized and after sterilization 150 ml. of sterile deionized water were added. To the mixture in the flask were then added 45 ml. of the inoculum prepared by the process of Example I and the material was thoroughly mixed. The mixed material was then incubated for about 20 days at 25° C. in a dark room in a water-saturated atmosphere.

The following example illustrates the recovery of F.E.S. from the fermentation medium.

Example III

A 300-gram portion of fermented material produced by the method of Example II was placed in 500 ml. of deionized water and slurried. The slurry was then heated for about 15 minutes at 75° C., 300 grams of filter aid were then added and the material was filtered. The solid filtered material containing the anabolic substance was then air dried, and 333 grams of the dried cake were then extracted with 500 ml. of ethanol. This procedure was repeated three more times. The ethanol extract was evaporated to dryness under vacuum to give 6.84 grams of solid material. This solid material was then dissolved in 20 ml. of chloroform and extracted with 30 ml. of an aqueous solution containing 5% by weight of sodium carbonate having an adjusted pH of about 11.2. The extraction process was repeated seven more times. The pH of the sodium-carbonate extract was then adjusted to 6.2 with hydrochloric acid, to yield an anabolic substance-containing precipitate. The precipitate and the aqueous sodium carbonate extract were then each in turn extracted with 75 ml. of ethyl ether. This procedure was repeated three more times to yield a light yellow ethereal solution, which was then evaporated to yield 116 mg. of solid anabolic substance. This material was then subjected to multiple transfer countercurrent distribution using 100 tubes and a solvent system consisting of two parts chloroform and two parts carbon tetrachloride as the lower phase and four parts methanol and one part water as the upper phase, all parts by volume. The solid material obtained from the multiple transfer countercurrent distribution was F.E.S.

The following examples, Examples IV to VI, illustrate the reduction of F.E.S. to produce dihydro F.E.S.

Example IV

Two 10-gram portions of F.E.S each in 200 milliliters acetic acid were catalytically reduced at room temperature in the presence of 1.2 grams of PdO catalyst at a hydrogen pressure of about 45 p.s.i. The combined reduction mixtures were heated to boiling, filtered, and the filter cake was washed with 50 milliliters of hot acetic acid. The cooled filtrate was added, with stirring, to 2 liters of water. The mixture was stirred for 15 minutes and the white solid was collected by filtration, washed and dried in a vacuum desiccator to yield 19.1 grams of dihydro F.E.S. having a melting point of 191°–193° C.

Example V

In an apparatus consisting of a 50 milliliter Erlenmeyer flask with a side arm leading to a manometer through a three-way stopcock were put 20 milliliters of ethanol, 0.5 milliliter of 10% cholorplatinic acid, 2.5 milliliters of 1 M ethanolic sodium borohydride solution, and then 2 milliliters of 6 N hydrochloric acid to form an active platinum catalyst. In about one minute 0.20 gram of F.E.S. was added, and then additional 1 M sodium borohydride at such a rate as to keep the pressure atmospheric. About 4 milliliters were added. This was repeated two times, and the ethanol from each of the last two runs was filtered, concentrated to about 2 milliliters, and filtered to give 0.14 gram of crystals melting at 180°–186° C. The two crops of crystals were combined, dissolved in 5 milliliters of hot ethanol, a little of the ethanol was evaporated, and the crystals filtered to give 0.10 gram of dihydro F.E.S. having a melting point of 189°–190° C. The analysis was:

|  | Calc. ($C_{18}H_{24}O_5$) | Found |
|---|---|---|
| Percent C | 67.5 | 67.4 |
| Percent H | 7.50 | 7.68 |

Example VI

The reduction of F.E.S. was conducted in ethanol using 50 p.s.i. of hydrogen and a small amount of 5% Pd on char catalyst for about 3 hours to produce dihydro F.E.S.

The production of dimethyl dihydro F.E.S. is illustrated by the following example.

Example VII

Dihydro F.E.S. (556 milligrams) was dissolved in 25 milliliters 10% NaOH and 10 milliliters water and the solution was stirred. To the stirred solution was added three, two-milliliter portions of dimethyl sulfate at half hour intervals followed by stirring for an additional hour. The mixture was acidic and it was made alkaline by the addition of 10 milliliters 10% NaOH and the alkaline mixture was stirred one-half hour. The solid formed was collected by filtration, washed with water and dried in a vacuum desiccator. The product weighed 526 milligrams and melted at 115°–117° C. Recrystallization from a mixture of 10 milliliters of water and 25 milliliters of ethanol provided 371 milligrams of material having a melting point of 124°–125.5° C. It was analyzed with the following results:

|  | Calc. ($C_{20}H_{28}O_5$) | Found |
|---|---|---|
| Percent C | 68.95 | 69.02 |
| Percent H | 8.10 | 8.12 |
| Percent $CH_3O$ | 17.81 | 17.81 |

The following example illustrates the production of monomethyl and dimethyl dihydro F.E.S., the monomethyl dihydro F.E.S. having a methyl group which replaced the hydrogen of the hydroxyl group on the benzene ring ortho to the ester group.

Example VIII

Dimethyl sulfate (5 ml.) was added to a solution of 2.24 g. F.E.S. in 80 ml. of a 10% NaOH solution and 20 ml. of water. The mixture was stirred for one-half hour at 18–20° C. (cooling bath) and an additional 5 ml. of dimethyl sulfate was added. After an additional 70 minutes of stirring at 20–26° C., the solid precipitate, Solid A, was collected by filtration, washed with water and dried. The filtrate from Solid A was acidified with 25 ml. 12 N $H_2SO_4$ to yield a second precipitate, Solid B, which was collected, washed with water, and dried.

Solid A (0.79 g. having a melting point of 114–118° C.) was recrystallized from a mixture of 10 ml. water and 15 ml. ethanol to yield 0.66 g. of dimethyl F.E.S. having a melting point of 108–110° C.

Solid B (1.39 g. having a melting point of 152–162° C.) was recrystallized twice from a mixture of water and alcohol to yield 0.80 g. of monomethyl F.E.S. product having a melting point of 169–174° C. Analysis of Solid B showed:

|  | Calc. ($C_{19}H_{24}O_5$) | Found |
|---|---|---|
| Percent C | 68.65 | 67.97 |
| Percent H | 7.28 | 7.16 |
| Percent OMe | 9.34 | 9.28 |

The olefinic bond of each of the dimethyl F.E.S. and monomethyl F.E.S. is reduced according to the procedure of Example VI.

Example IX

Monomethyl F.E.S. with the methyl group replacing the hydrogen of the hydroxyl group on the benzene ring para to the ester group was prepared by the following procedure.

Nitrosomethylurea in an amount of 1.2 grams was slowly added to a cold mixture of 3.6 milliliters of 50% potassium hydroxide and 17 milliliters of ether. After a few minutes the yellow ether layer of the mixture was decanted, dried over potassium hydroxide, and then added to a solution of 0.30 gram F.E.S. in 17 milliliters of ether. The resulting yellow mixture was left overnight in a loosely stoppered flask and then ether and diazomethane were evaporated off using a steam bath. The remaining gummy residue was crystallized by adding 3 milliliters of water, heating to 60° C., and adding ethanol almost to solution. On cooling, crystals formed, yielding 0.137 gram of a product having a melting point of 111–116° C. which was again recrystallized in the same way to yield 0.082 gram of monomethyl F.E.S. having a melting point of 120–122° C. and the following analysis:

|  | Calc. ($C_{19}H_{24}O_5$) | Found |
|---|---|---|
| Percent C | 68.7 | 68.3 |
| Percent H | 7.28 | 7.38 |
| Percent $OCH_3$ | 9.34 | 9.17 |

The olefinic bond of this compound is reduced according to the procedure of Example VI.

The following example demonstrates the activity of the new compounds according to the mouse-uterine test. Under the mouse-uterine test, a solution of the test substance is placed on a standard pulverized mouse ration and the solvent is removed by evaporation to provide a dry ration containing a known weight of the substance per gram of ration. This ration is then fed to ovariectomized mice weighing about 20 grams at a level of 3 grams per mouse per day for a period of 5 days after which the mice are weighed and the uteri removed and weighed. An increase in the weight of the uterus over the weight of the uterus in a control animal demonstrates the presence of estrogenic activity for the test substance. The magnitude of the increase is proportional to the weight of the estrogen consumed. The method can be used as a quantitative assay by comparison with responses obtained with a pure form of the estrogen under examination.

*Example X*

The estrogenic acivity of dihydro F.E.S. is shown by the following mouse-uterine test involving 10 mice with the control mice having an average uterus weight of 11.6 milligrams. When the compound was added at a level of 6.25 micrograms per gram of feed, the uterus weight was 16.7 milligrams on the average. At 12.5 micrograms per gram of feed, the average uterus weight was 25.4 milligrams. When compared with F.E.S. at levels of 6.25 and 12.5 micrograms per gram of feed, this amounts to an increase of the uterus weight on the average of about .16 milligrams at the 6.25 level and 2.9 milligrams at the 12.5 level. The increase in response as a percent of the response to F.E.S. at the same level was 103.24% at the 6.25 level and 126.6% at the 12.5 level.

*Example XI*

The dihydro F.E.S. compound was given to mice following the mouse-uterine test of Example X. At a level of 25 micrograms per gram of feed, the average uterus weight was 39.4 milligrams which was 178.05 percent of the response to F.E.S. at the same level.

*Example XII*

Six head of cattle are fed a daily ration including a mixture of alfalfa hay and ground corn cobs containing from 1 to 20 ounces of dihydro F.E.S. per hundred pounds of ration to increase the rate of growth of the cattle.

It is claimed:

1.

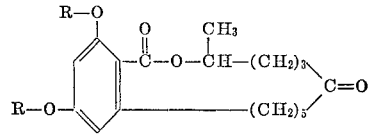

wherein R is selected from the group consisting of hydrogen and lower alkyl.

2. The compound of claim 1 wherein R is hydrogen.
3. The compound of claim 1 wherein R is lower alkyl.
4. An animal feed comprising a nutritional diluent and growth promoting amounts of the compound of claim 1.
5. The compound of claim 1 wherein R is methyl.
6. The compound of claim 1 wherein the R ortho to the ester group is methyl and the other R is hydrogen.
7. The compound of claim 1 wherein the R para to the ester group is methyl and the other R is hydrogen.
8. An animal feed comprising a nutritional diluent and growth promoting amounts of the compound of claim 2.
9. An animal feed comprising a nutritional diluent and growth promoting amounts of the compound of claim 3.
10. An animal feed comprising a nutritional diluent and growth promoting amounts of the compound of claim 5.
11. An animal feed comprising a nutritional diluent and growth promoting amounts of the compound of claim 6.
12. An animal feed comprising a nutritional diluent and growth promoting amounts of the compound of claim 7.

References Cited by the Examiner

UNITED STATES PATENTS 2,842,051   8/1958   Brian et al. _____ 99—2

OTHER REFERENCES

Stob et al.: Nature, vol. 196, page 1318, December 29, 1962.

A. LOUIS MONACELL, *Primary Examiner.*